Jan. 13, 1925.  
W. C. COOK  
1,522,944  
MEANS FOR STUFFING DRIED FRUITS  
Filed April 18, 1922  3 Sheets-Sheet 1

Fig. 1

INVENTOR  
WILLARD C. COOK  
BY  
Frank Waterfield  
ATTORNEY

Jan. 13, 1925.                                                                   1,522,944
W. C. COOK
MEANS FOR STUFFING DRIED FRUITS
Filed April 18, 1922            3 Sheets-Sheet 2
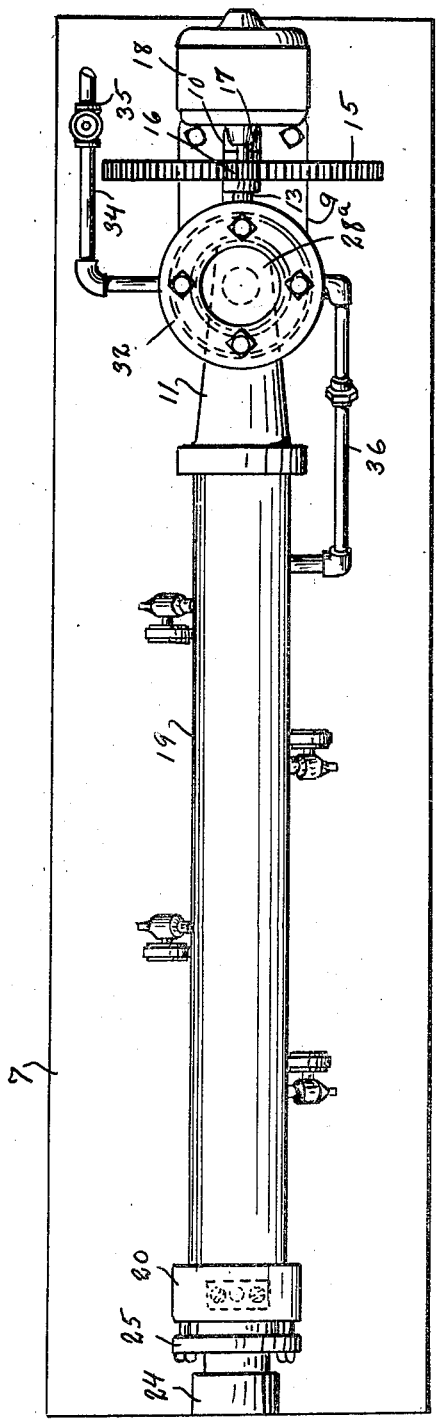
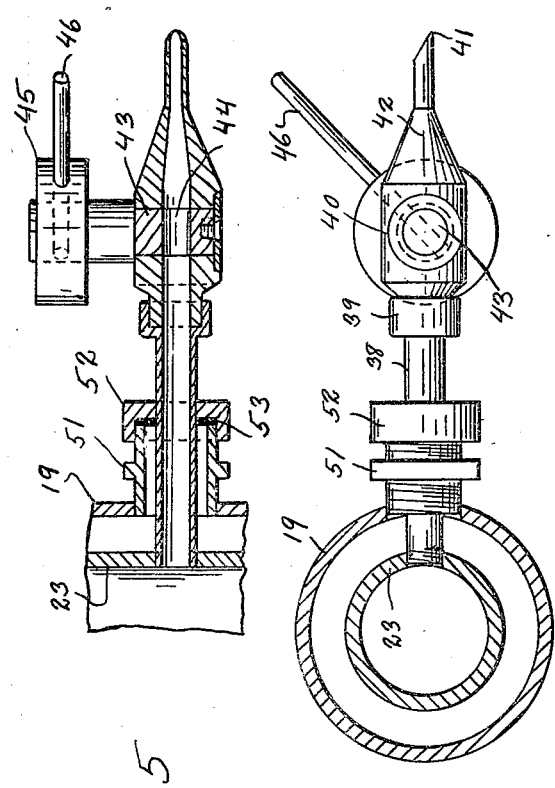
INVENTOR
WILLARD C. COOK
BY
Frank Waterfield
ATTORNEY Jan. 13, 1925.  1,522,944
W. C. COOK
MEANS FOR STUFFING DRIED FRUITS
Filed April 18, 1922    3 Sheets-Sheet 3
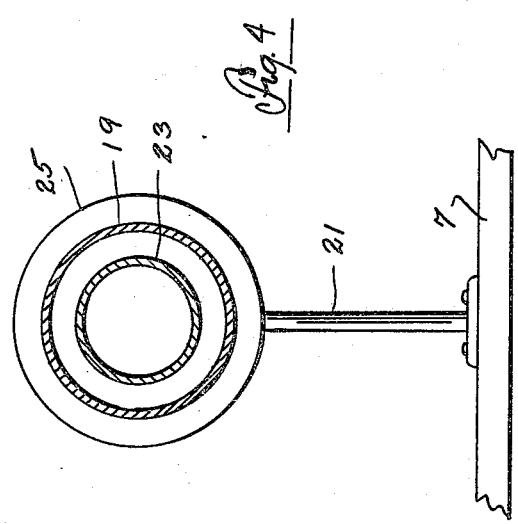
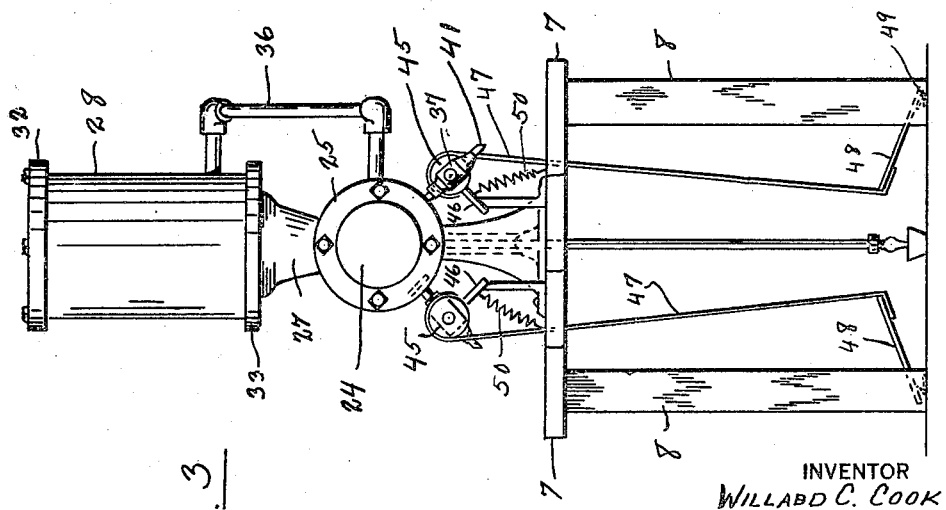
INVENTOR
WILLARD C. COOK
BY
Frank Waterfield
ATTORNEY Patented Jan. 13, 1925.

1,522,944

UNITED STATES PATENT OFFICE.

WILLARD C. COOK, OF CLOVIS, CALIFORNIA.

MEANS FOR STUFFING DRIED FRUITS.

Application filed April 18, 1922. Serial No. 555,254.

*To all whom it may concern:*

Be it known that I, WILLARD C. COOK, a citizen of the United States, and resident of Clovis, in the county of Fresno, State of California, have invented certain new and useful Improvements in Means for Stuffing Dried Fruits, of which the following is a specification.

My invention relates primarily to a method of and means for stuffing dried fruit, particularly figs, although I do not limit myself to figs but reserve the right to apply my invention to any other suitable fruit, with a filling of any suitable or desirable confection.

Another object is to provide a simple and efficient device for the above purpose.

Other objects and advantages will appear hereinafter, and, which I have shown and will describe the preferred form of my invention, it will be understood that I do not limit myself to such preferred form but that various changes and adaptations may be made therein without departing from the spirit of my invention.

In the drawings accompanying and forming a part hereof:

Fig. 1 is a side elevation, partly broken away, of my means for stuffing dried fruit.

Fig. 2 is a top plan of Fig. 1.

Fig. 3 is a left hand elevation of Fig. 1.

Fig. 4 is an enlarged section on the line 4—4 of Fig. 1.

Fig. 5 is a top plan of the feed valve.

Fig. 6 is a side elevation of Fig. 5.

Referring to the drawings, my device comprises a bench or table 7, supported at a suitable height above the floor by legs 8 at each corner thereof. Mounted on the upper face of table 7, at one end thereof, is a substantially U-shaped bracket 9, one leg of which extends upwardly and terminates in a bearing 10, and the other leg has mounted upon its upper end a casing 11 in which is revolubly mounted a feed screw or worm 12. Worm 12 is provided with a shaft 13 which extends rearwardly through a bearing 14 in casing 11, and its free end is revolubly mounted in bearing 10. Mounted upon shaft 13, at the side of bearing 10, is a gear wheel 15, which wheel meshes with a spur wheel 16 rigidly mounted upon the shaft 17 of a motor 18, by means of which screw 12 is rotated. Mounted at one end in the forward end of casing 11 is a cylindrical casing 19, the other end of which is closed by a cap 20. A standard 21 extending from the lower face of cap 20 to the upper face of table 7 serves as means for supporting the free end of casing 19 and cap 20. Extending from the free end of casing 11 and communicating with feed chamber 22, in which screw 12 is mounted, is a cylindrical casing 23 which extends longitudinally through casing 19 concentric therewith, and its free end is closed by a detachable cap 24, a stuffing box 25 and packing 26 providing means for forming a tight joint between casing 23 and cap 20. Extending upwardly from casing 11 is a feed hopper 27 upon the upper end of which is rigidly mounted a supply casing 28, centrally of which is provided a supply chamber 28ª the lower end of which communicates with hopper 27. Casing 28 is preferably cylindrical in horizontal cross section and is formed of an outer casing 29 and an inner casing 30 mounted concentrically but spaced apart to provide a heating chamber 31 between said casings. The ends of said casings are closed by caps 32 and 33. A supply pipe 34 provided with a regulating valve 35 connects heating chamber 31 to a source of supply, not shown. Extending from casing 28, in communication with chamber 31, is a supply pipe 36 the other end of which extends to and communicates with the interior of casing 19. Extending outwardly and downwardly at an angle from casing 19, at suitable intervals, are the injectors 37 by means of which the filling is forced into the interior of the fruit. Inasmuch as I have shown a plurality of injectors and that all of said injectors are of the same construction, it is considered necessary to describe only one of them. Injectors 37 comprise a feed pipe 38, one end of which is connected to and communicates with the interior of casing 23, the other end of which extends outwardly and terminates in a socket 39 in which socket is mounted one end of a supply valve casing 40 in screw threaded engagement therewith. The other end of supply valve casing 40 is reduced in size and terminates in a sharpened end 41 for a purpose hereinafter described. Valve casing 40 is provided centrally and longitudinally thereof with a supply passage 42, and a valve 43 is mounted in valve casing 40 to extend transversely, and is provided with an opening or passage 44 extending transversely of valve 43 so that when valve 43 is rotated to bring opening 44 into register with passage 42 the material or filling will be allowed to flow from the interior of casing 23, through passage 42, and out of the end 41 of casing 40. The free end of valve 43 is enlarged and projects outwardly from the side of casing 42 in a substantially horizontal plane and has rigidly mounted upon the end thereof a pulley 45 and is also provided with a handle 46. Secured at one end to pulley 45 and passing partly around the same, is an operating belt or strap 47, the free end of which extends downwardly and is connected to the free end of a treadle 48, which treadle has its other end pivotally connected to the floor by means of a hinge 49 or otherwise, whereby as the free end of treadle 48 is pressed downwardly, valve 43 will be rotated to open the passage 42 and permit material to flow therethrough. A coil spring 50 connecting the free end of handle 46 to the table provides means for returning valve 43 to its normal closed position upon the release of treadle 48. Extending outwardly from casing 19, and communicating with the interior thereof, concentric with pipe 38, is a nipple 51, the free end of which is closed by a cap 52, suitable packing 53 providing means for making a tight joint between pipe 38 and cap 52, this construction providing means for heating a portion of pipe 38.

In the operation of my device the parts will be positioned as shown in Figs. 1, 2 and 3. A supply of the desired material with which the fruit is to be filled is placed in supply chamber 28ª, it being understood that steam has previously been admitted into chamber 31 and casing 19. The motor will then be rotated until the interior of the casing 23 is filled with the material from chamber 28ª, it being understood that the material when heated will be in a fluid state, and will, by means of screw 12, be conveyed from hopper 27 into said casing 23. A fig or other desired fruit will then be impinged upon the sharpened end 41 of casing 40, preferably at the blossom end of the fruit, the treadle will then be pressed downwardly by the foot of the operator and sufficient material permitted to enter the interior of the fruit to fill and restore the same to substantially its normal natural size and shape. The treadle will then be released and the fruit so filled replaced by an unfilled fruit and the treadle will be again operated as before. While I have shown a feed screw or worm as the means of providing sufficient pressure, it will be understood that I do not limit myself to this particular method but that any other form of pressure may be used, such as air, steam, or otherwise.

Having described my invention what I claim is:

1. A machine for stuffing fruit comprising a filling chamber; a steam jacket surrounding said filling chamber; a pressure device on one end of said filling chamber; a supply casing connected to said pressure device; a steam jacket surrounding said supply chamber; a supply for said steam jacket; a connection between said steam jackets; means to operate said pressure device; injectors communicating with said supply chamber and extending to atmosphere; and means to control the passage of material through said injectors.

2. A machine for producing stuffed dried fruit comprising a plurality of manually operated injectors adapted to have their free ends inserted in the interior of the fruit and being connected at their other ends to a source of supply under pressure; and means to operate said injectors to permit the passage of material therethrough into the interior of said fruit.

3. A machine for stuffing dried fruit comprising a filling chamber; a pressure device on one end of said filling chamber; a supply casing connected to said pressure device; means to operate said pressure device; injectors communicating with said supply chamber and extending to atmosphere; and means to control the passage of material through said injectors.

4. A machine for stuffing dried fruit comprising a supply chamber; a pressure device connected at one end to said supply chamber; means to operate said pressure device; injectors communicating with said pressure device and extending to atmosphere; and means to control the passage of material through said injectors.

5. A machine for stuffing fruit comprising a filling chamber; means to heat said filling chamber; a pressure device on one end of said filling chamber; a supply casing connected to said pressure device; heating means for said supply chamber; means to operate said pressure device; injectors communicating with said supply chamber and extending to atmosphere; and means to control the passage of material through said injectors.

6. A device for stuffing fruit comprising a pressure feeding device; means to operate said feeding device; injectors connected to said feeding device and opening to atmosphere; and means to control the passage of material through said injectors.

7. A device for stuffing fruit comprising a pressure feeding device; a source of supply for said feeding device; means to operate said feeding device; injectors connected to said feeding device and opening to atmosphere; and means to control the passage of material through said injectors.

In witness that I claim the foregoing I have hereunto set my hand this 7 day of April, 1922.

WILLARD C. COOK.